3,320,052
FLUX USED IN THE MAKING OF STEEL
James J. Bowden, P.O. Box 127, Cortland, Ohio 44410
No Drawing. Filed Sept. 17, 1964, Ser. No. 397,302
2 Claims. (Cl. 75—53)

My invention relates to a flux used in the making of steel, and to the method of producing such flux, and the principal object of my invention is to produce new and improved flux and methods of making the same.

In U.S. Patent No. 2,283,622, issued to James J. Bowden and John S. Suda, there is disclosed an improvement in the manufacture of iron and steel through the incorporation of alumina ($Al_2O_3$) in such proportion as to secure in the tapping or draw off slag the presence of a sufficient amount of alumina to replace or inhibit an excess of iron oxide ($Fe_2O_3$) which otherwise would be present in such a slag in the form of calcium ferrites.

The present invention provides a further improvement in that the necessary alumina is provided at a greatly reduced cost, without sacrificing any of the beneficial results obtained through use of the process disclosed in said patent. As a matter of fact, the alumina is derived from sources which heretofore represented waste products and which required treatment to reduce the obnoxiousness thereof.

More specifically, I have discovered that the exceedingly fine powder which resulted in the aluminum smelting process and which heretofore was not only considered a waste but also presented problems in reducing it to proper waste form, may be effectively used to provide the alumina and cryolite used in the patented process aforesaid. Alumina is very useful in a slag making process, as is cryolite. The fact that cryolite has not heretofore been extensively used is because it is expensive to produce. However, its presence in a waste product provides an extra which is very beneficial.

As background explanation, in the aluminum smelting process aluminum is separated from the oxygen with which it is combined in nature by passing an electric current through a solution of cryolite, in which solution the alumina is dissolved. To accomplish this reduction, a direct current is passed through large, carbon-lined smelting pots which are filled with molten cryolite (sodium aluminum fluoride) in which alumina ($Al_2O_3$) is dissolved. The principal materials for this electrolyte are a finely crushed cryolite containing approximately 6% calcium fluoride and 9% aluminum oxide. It has been found that the fluorspar may vary from 1% to 10% and the aluminum oxide may vary from 2% to 9%.

The passage of electricity through the solution causes metallic aluminum to be deposited on the bottom of the pot (cathode) while the oxygen that was part of the alumina combines with the carbon anode and is released as carbon dioxide gas ($CO_2$).

This smelting process is continuous and periodically molten aluminum is siphoned from the pot (or cell as it is technically named). As the alumina content in the cryolite bath is reduced, more alumina is added from time to time to the pot. Heat which is generated by the passage of the electric current through the mixture in the pot maintains the cryolite bath in a molten condition so that it will continue to dissolve the added alumina and cryolite.

In the foregoing procedure, the addition of alumina, cryolite and fluorspar which are in the form of exceedingly fine powders, creates a tendency to produce a diffused, dusty atmosphere containing alumina, fluorspar and cryolite. The dust is detrimental to efficient operations and thus an elaborate dust collecting system had to be provided to effectively remove the unwanted dust. In order to prevent the dust from again being airborne after it is removed from the smelting area, the dust is taken through a series of water sprays and ultimately collected as a slurry and taken through pipes to a refuse area which may be an excavated hole or some other storage means as tanks and the like.

The sludge is fifty or more percent water when it comes from the dust collecting system and the following arrangements present typical analyses of the solids present in sludges which contained about 53.1% water:

Arrangement No. 1

| Solids: | Percent |
|---|---|
| Fluorine (F) | 22.0 |
| Sodium oxide ($Na_2O$) | 15.7 |
| Silica ($SiO_2$) | 5.9 |
| Ferric oxide ($Fe_2O_3$) | 2.4 |
| Alumina ($Al_2O_3$) | 19.1 |
| Carbon | 5.1 |
| Calcium | 28.3 |
| Total | 98.5 |

Arrangement No. 2

| Solids: | Percent |
|---|---|
| Cryolite ($Na_3AlF_6$) | 28.8 |
| Fluorspar ($CaF_2$) | 12.7 |
| Lime (CaO) | 30.5 |
| Alumina ($Al_2O_3$) | 12.1 |
| Silica ($SiO_2$) | 5.9 |
| Carbon | 5.1 |
| Ferric oxide ($Fe_2O_3$) | 2.4 |
| Total | 97.5 |

The small percentage difference between the above and 100% is represented by materials which are of no great importance to the present matter. It will be understood that the above arrangements are typical and that many variations in the specific analysis of other sludges may exist.

I have discovered that the composition of the sludge resulting from an aluminum smelting system may be used to good advantage in treating slag in a steel making process, such as disclosed in the above-mentioned patent. In a patent issued to me and John S. Suda, No. 2,480,901, there is disclosed the use of aluminum dross resulting from an aluminum smelting process, but at that time it was considered necessary to dry the slurry and this represented considerable storage time to dry it naturally, or considerable expense in equipment to dry it more hurriedly. In a subsequent patent (No. 2,927,852), issued to me, I proposed the intimate mixture of powdered aluminum dross with liquified coal tar or pitch, so that briquettes may be formed.

I have now discovered that the sludge which results as a waste product in an aluminum reduction or production system may be directly used in the treatment of steel making slag although because of the difficulty in handling it and the danger of introducing it moist to the hot charge of the steel furnace, I found it preferable to mix the sludge with lime, limestone, iron oxide, mill scale, dolomite, or aluminum dross or a combination of the same, to more nearly approach the composition of a finished steel making slag. An additional advantage in adding the foregoing minerals is found in the fact that they absorb the moisture of the sludge and therefore make for a more easily workable and usable composition, and also eliminate the danger of introducing a moist composition to the highly heated steel bath.

The approximate composition (theoretical) of the minerals that may be added to the sludge are given below:

| Flux mixed with sludge | CaO | MgO | $SiO_2$ | $Al_2O_3$ $+Fe_2O_3$ | $CO_2$ |
|---|---|---|---|---|---|
| Limestone | 54.0 | .88 | .61 | .28 | 43.50 |
| Burnt Lime | 95.0 | .75 | .95 | 1.41 | 1.65 |
| Raw Dolomite | 30.30 | 21.56 | .14 | .48 | 47.28 |
| Single Burnt Dolomite | 44.80 | 34.48 | .56 | 1.12 | 18.30 |

The above-noted flux, which are standard steel making flux additions, become part of the chemical makeup of the steel making slag, and the fusion of this flux to produce a steel making slag is aided by the components in the sludge, such as the minerals cryolite, fluorspar, lime, alumina and ferric oxide, as designed in arrangement No. 2 above.

A typical analysis of a steel making slag is given below, together with the composition of the accompanying heat of steel that underlies such slag:

For the same heat of steel

Slag analysis is: Percent
- CaO — 41.08
- $SiO_2$ — 11.37
- FeO — 19.30
- $Fe_2O_3$ — 8.70
- MnO — 9.61
- MgO — 6.28
- $Al_2O_3$ — 1.60
- $P_2O_5$ — 1.7

Steel analysis (in furnace) is: Percent
- Carbon — .065
- Manganese — .12
- Phosphorus — .008
- Sulfur — .019
- Oxygen — .061

The constituents contained in the sludge which results as a waste in the aluminum smelting industry include such minerals as cryolite, fluorspar, alumina and iron oxide, all of which are in themselves very useful in fluxing the lime in the steel slag making process, so that the sludge itself, when dried, may be used as an excellent flux to, and as an aid in the solubilitizing of the lime, in the slag making charge.

In addition, however, this sludge is much more versatile in that it may be mixed with various proportions of one or more of the ingredients including limestone, lime, iron oxide or mill scale and raw or burnt dolomite to make a less potent but nonetheless highly useful flux addition to the steel making charge since in so mixing these very basic materials with the sludge none of the basic values which are so necessary in the steel making process are lost.

As much as six parts of limestone or lime (CaO) may be mixed with one part of this aluminum sludge to produce a mixture that may be substituted for the standard lime charge used in all of the various steel making practices, such as open hearth, electric and oxygen processes. Further, since the sludge carries with it fifty percent or more of water, it may be successfully dried by mixing one to ten parts of lime, limestone or dolomite with the sludge, after which it is thoroughly mixed by mechanical means.

In some cases where it is required that the resulting mixture be in some form that will facilitate handling, the mixture may be briquetted and in cases where briquetting is desirable and a more durable briquet is required, a small amount (3% to 10%) of cement, either the Portland, or aluminate, variety, may be added to the mixture, and the latter then permitted to set up. In other cases, the mixture may be put through a briquetting machine, such as a Komarek Greaves briquette machine, to form briquets which are easily handled.

Composition of specimen mixtures of the sludge with other flux such as limestone, lime and dolomite are shown below. The designated specimen mixtures use limestone as an example and illustrate theoretical variations resulting from such mixtures.

SPECIMEN MIXTURES OF SLUDGE AND OTHER FLUX

| Material | Parts | CaO | MgO | $SiO_2$ | $Al_2O_3$ | $Fe_2O_3$ | $CaF_2$ | Cryolite | $CO_2$ | Carbon | Total |
|---|---|---|---|---|---|---|---|---|---|---|---|
| Sludge | 100 | 30.50 | | 5.90 | 12.10 | 2.40 | 12.70 | 28.80 | | 5.10 | 97.50 |
| Limestone | 100 | 53.50 | .80 | .61 | .14 | .14 | | | 44.00 | | 99.19 |
| Total | 200 | 84.00 | .80 | 6.51 | 12.24 | 2.54 | 12.70 | 28.80 | 44.00 | 5.10 | |
| Average | 100 | 42.00 | .40 | 3.25 | 6.12 | 1.27 | 6.35 | 14.40 | 22.00 | 2.55 | 98.34 |
| Sludge | 100 | 30.50 | | 5.90 | 12.10 | 2.40 | 12.70 | 28.80 | | 5.10 | 97.50 |
| Limestone | 200 | 107.00 | 1.60 | 1.22 | .28 | .28 | | | 88.00 | | 198.38 |
| Total | 300 | 137.50 | 1.60 | 7.12 | 12.38 | 2.68 | 12.70 | 28.80 | 88.00 | 5.10 | 297.88 |
| Average | 100 | 45.83 | .53 | 2.37 | 4.13 | .89 | 4.23 | 9.60 | 29.33 | 1.70 | 96.65 |
| Sludge | 100 | 30.50 | | 5.90 | 12.10 | 2.40 | 12.70 | 28.80 | | 5.10 | 97.50 |
| Limestone | 300 | 160.50 | 2.40 | 1.83 | .42 | .42 | | | 132.00 | | 297.57 |
| Total | 400 | 191.00 | 2.40 | 7.73 | 12.52 | 2.82 | 12.70 | 28.80 | 132.00 | 5.10 | 395.07 |
| Average | 100 | 47.75 | .60 | 1.93 | 3.13 | .70 | 3.17 | 7.20 | 33.00 | 1.27 | 98.7 |
| Sludge | 100 | 30.50 | | 5.90 | 12.10 | 2.40 | 12.70 | 28.80 | | 5.10 | 97.50 |
| Limestone | 500 | 267.50 | 4.00 | 3.66 | .70 | .70 | | | 220.00 | | 495.95 |
| Total | 600 | 298.00 | 4.00 | 9.56 | 12.80 | 3.10 | 12.70 | 28.80 | 220.00 | 5.10 | 493.45 |
| Average | 100 | 49.67 | .67 | 1.59 | 2.13 | .52 | 2.12 | 4.80 | 36.67 | .85 | 99.62 |
| Sludge | 100 | 30.50 | | 5.90 | 12.10 | 2.40 | 12.70 | 28.80 | | 5.10 | 97.50 |
| Limestone | 600 | 321.00 | 4.80 | 3.66 | .84 | .84 | 0.00 | 0.00 | 264.00 | 0.00 | |
| Total | 700 | 351.50 | 4.80 | 9.56 | 12.94 | 3.24 | 12.70 | 28.80 | 264.00 | 5.10 | |
| Average | | 50.30 | .69 | 1.36 | 1.85 | .46 | 1.81 | 4.12 | 37.71 | .73 | 98.96 |
| Sludge | 300 | 90.90 | | 17.70 | 36.30 | 7.20 | 38.10 | 86.40 | | 15.30 | 291.90 |
| Raw Dolomite | 100 | 30.30 | 21.56 | .14 | .24 | .24 | | | 47.28 | | 99.76 |
| Total | 400 | 121.20 | | 17.84 | 36.54 | 7.44 | 38.10 | 86.40 | | 62.58 | 390.66 |
| Average | | 30.30 | 5.39 | 4.46 | 9.14 | 1.86 | 9.52 | 21.60 | | 15.64 | 97.66 |

I have also found that red mud, which is a waste product in the production of alumina, may be used in place of the sludge aforementioned.

In an article entitled "Basic Principles of Bayer Process Design," contained in vol. I of a book entitled "Extractive Metallurgy of Aluminum," published by Interscience Publishers, a division of John Wiley & Sons, the authors, A. N. Adamson, E. J. Bloore and A. R. Carr, discuss the chemical considerations affecting the Bayer process for the production of alumina from bauxite found in various forms throughout the world.

Briefly, alumina is extracted from bauxite under conditions chosen to facilitate the removal of silica. Primary separation may be carried out in continuous settling and thickening equipment, or in filters depending upon the settling or filtration characteristics of the residue. In any event, the residue, termed red mud, although it is largely considered a waste material, has a sufficiently high content of alumina to make it attractive to be used in carrying out my invention.

As before, the red mud is preferably mixed with various proportions of one or more of the ingredients including limestone, lime, iron oxide or mill scale, and raw or burnt dolomite to effect drying of the red mud and to produce a highly useful flux addition to the steel making charge. The dried or almost dry mixture may be briquetted, if desired, and cement may be added to the mixture to facilitate drying and briquetting.

The following charts provide examples of the mixtures and percentages of ingredients useful in making a good steel making slag:

|  | Parts | CaO | $SiO_2$ | $Al_2O_3$ | $Fe_2O_3$ | $TiO_2$ | $Na_2O$ | Ignition Loss | Total |
|---|---|---|---|---|---|---|---|---|---|
| Red mud | 100 |  | 28.72 | 27.79 | 15.38 | 1.07 | 15.19 | 10.79 | 98.94 |
| Burnt Lime | 100 | 94.74 | .96 | .49 |  |  |  | 1.65 | 94.74 |
| Total | 200 | 94.74 | 29.68 | 28.28 | 15.38 | 1.07 | 15.19 | 12.44 | 197.68 |
| Average |  | 47.37 | 14.84 | 14.14 | 7.69 | .53 | 7.59 | 6.22 | 98.84 |
| Red mud | 100 |  | 28.72 | 27.79 | 15.38 | 1.07 | 15.19 | 10.79 | 98.94 |
| Burnt Lime | 400 | 378.96 | 3.84 | 1.96 |  |  |  | 6.60 | 394.96 |
| Total | 500 | 378.96 | 32.56 | 29.75 | 15.38 | 1.07 | 15.19 | 17.39 | 493.90 |
| Average |  | 75.79 | 6.51 | 5.95 | 3.07 | .21 | 3.04 | 3.48 | 98.78 |

If briquetted add from 3% to 10% cement to act as binder.

MIXTURES OF RED MUD AND LIMESTONE

|  | Parts | CaO | $SiO_2$ | $Al_2O_3$ | $Fe_2O_3$ | $TiO_2$ | $Na_2O$ | Ignition Loss | Total |
|---|---|---|---|---|---|---|---|---|---|
| Red mud | 100 |  | 28.72 | 27.79 | 15.38 | 1.07 | 15.19 | 10.79 | 98.94 |
| Limestone | 100 | 15.50 | .75 | .50 | .50 |  |  | 44.00 | 99.20 |
| Total | 200 | 53.50 | 29.47 | 28.29 | 15.88 | 1.07 | 15.19 | 54.79 | 198.14 |
| Average | 100 | 21.75 | 14.73 | 14.15 | 7.94 | .53 | 7.59 | 27.39 | 99.08 |
| Red mud | 100 |  | 28.72 | 27.79 | 15.38 | 1.0 | 15.19 | 10.79 | 98.94 |
| Limestone | 400 | 214.00 | 3.00 | 2.00 | 2.00 |  |  | 176.00 | 397.00 |
| Total | 500 | 214.00 | 31.72 | 29.79 | 17.38 | 1.07 | 15.19 | 186.79 | 495.94 |
| Average |  | 42.80 | 6.34 | 5.96 | 3.47 | .21 | 3.04 | 37.39 | 99.19 |

If briquetted add 3% to 10% cement to act as a binder.

I have also discovered that the dust recovered from the milling of aluminum skimmings may be used as a drying agent with either the sludge or red mud aforesaid, and such dust may be used alone or in combination with any one of the drying ingredients mentioned above.

It will be appreciated that the addition of the basic minerals as above denoted, act as dryers for the sludge and making it more amenable to its preparation for use as a slag making flux of a quality as high as, and at a cost much lower, than the slag making flux hereinbefore used.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. The method of producing a low-cost steel-making flux from a waste product produced in the manufacture of aluminum by melt electrolysis of a solution of aluminum oxides in molten fluorides, said oxides and fluorides being introduced into the melt furnace in genrally powdery state wherein a dust is formed by such introduction and whereby dust particles are entrained in the gas formed in the reduction of aluminum oxides to aluminum metal, said dust being collected and treated with water to inhibit its tendency to remain airborne and said water transforming the dust into a sludge, the method comprising adding to and mixing with the sludge materials selected from the group consisting of lime, limestone, iron oxide, mill scale and dolomite until the water in the sludge is absorbed to the extent that the mixture may be safely charged into a steel-making furnace as a flux to assist in the steel-making process.

2. The method of claim 1 and further including the step of adding a binder material to the mixture and then briquetting the resultant.

References Cited by the Examiner

UNITED STATES PATENTS

| 2,416,179 | 2/1947 | Kemmer | 75—53 |
| 2,480,901 | 9/1949 | Bowden et al. | 75—53 |
| 2,854,328 | 9/1958 | Rossborough | 75—53 |
| 2,927,852 | 3/1960 | Bowden | 75—53 |
| 2,043,914 | 7/1960 | Moser | 204—247 |
| 2,947,673 | 8/1960 | Sem et al. | 204—247 |

BENJAMIN HENKIN, *Primary Examiner.*